July 19, 1960
E. FRANKED
2,945,706
SEALING DEVICE FOR SEALING BETWEEN COOPERATING
MACHINE ELEMENTS ROTATABLE RELATIVE EACH OTHER
Filed Jan. 21, 1958
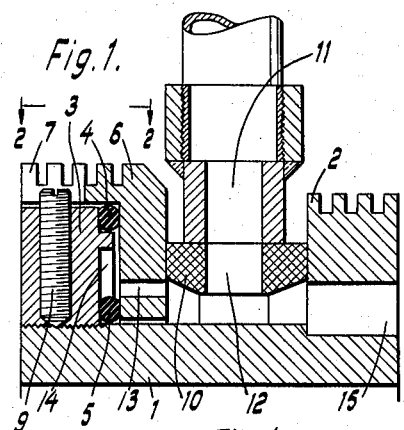
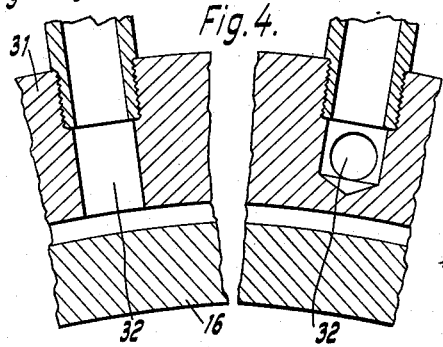
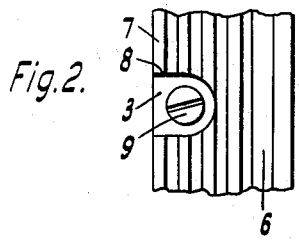
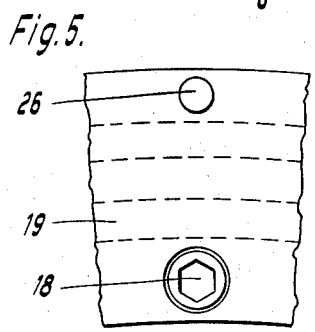
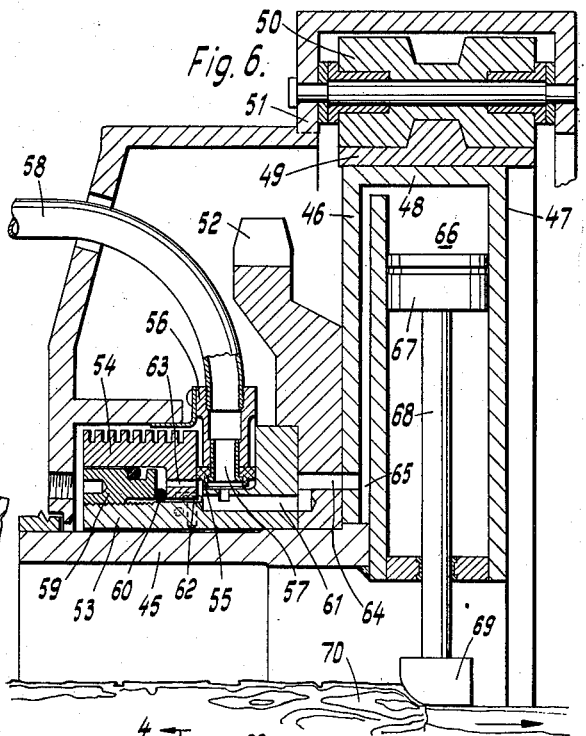
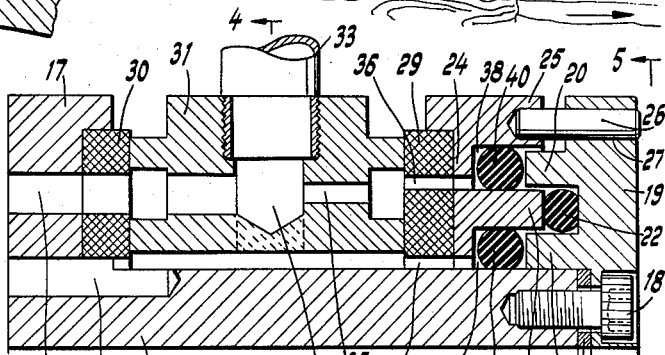
INVENTOR.
E. Franked United States Patent Office 2,945,706
Patented July 19, 1960

2,945,706

SEALING DEVICE FOR SEALING BETWEEN COOPERATING MACHINE ELEMENTS ROTATABLE RELATIVE EACH OTHER

Enver Franked, Borlange, Sweden, assignor to Aktiebolaget Anderssons Barkmaskin, Gavle, Sweden Filed Jan. 21, 1958, Ser. No. 710,322

Claims priority, application Sweden Feb. 9, 1957

7 Claims. (Cl. 285—96)

The present invention relates to a sealing device for sealing between relatively rotatable cooperating machine elements, such as shafts, drums and the like, and consists of one or more stationarily arranged ring shaped members in cooperating sealing engagement with rotatable ring shaped members.

Sealing means are previously known where the effective sealing pressure between such cooperating machine elements is effected either by means of a gaseous pressure medium or by compression of spiral shaped or other steel springs or by compression of rubber cushions and the like.

The object of the present invention is primarily to effect adequate sealing by applying an adjustable initial pressure between cooperating sealing members and in addition to this initial pressure to provide for a greater or smaller increase in the sealing pressure between these members by means of a liquid- or gaseous pressure medium, so as to adapt to different required sealing pressures that may appear necessary.

The invention is principally characterized thereby, that the sides of the stationary member facing the axially spaced ring shaped rotatable members, or the sides of the rotatable members facing the opposite faces of the stationary member are provided with ring shaped parts of inelastic material having good frictional properties. These ring shaped parts are in sealing contact with metallic surfaces of the members cooperating with said parts. Further, one of said rotatable members is axially movable on a rotatable machine element carrying both rotatable members and imparts an adjustable initial pressure against the side surface of the stationary ring shaped member by means of at least one O-ring of elastic material, such as rubber or the like. This O-ring in its turn is being subjected to pressure by actuation of a member that is axially adjustably, displaceable on said machine element. The stationary member in turn is simultaneously pressed against the other of the rotatable members. In addition, the first mentioned axially movable member is acted upon by a liquid- or gaseous pressure medium so as to effect an increased sealing pressure beyond said adjustable initial pressure against the side surfaces of the stationary member.

Other characterizing features of the invention will become further explained in connection with the following description of embodiments illustrated as examples in the attached drawing, in which:

Fig. 1 is a fragmentary longitudinal sectional view through one embodiment of a sealing arrangement constructed in accordance with the invention, Fig. 2 is a fragmentary plan view as viewed along the viewing line 2—2 of Fig. 1, Fig. 3 is a view similar to Figure 1 illustrating another embodiment of a sealing arrangement, Fig. 4 is a cross sectional view taken along lines 4—4 of Fig. 3, Fig. 5 is a fragmentary end elevation as seen along the viewing line 5—5 of Fig. 3, and Fig. 6 is a fragmentary longitudinal sectional view illustrating the subject matter of the invention as applied to a debarking machine.

In Fig. 1 a rotatable machine element means 1 is rigidly connected to a shaft (not illustrated). One end of sleeve 1 is provided with a laterally directed flange 2. The other end of this element 1 is provided with screw threads and on this end is screwed an adjusting ring 3. On the inside of this ring are provided two O-rings 4 and 5 of rubber or the like material, which in their turn are in contact with a ring shaped part 6 mounted to be axially movable on the element 1. This part 6 is provided with a flange 7 that surrounds the adjusting ring 3. This flange is provided with a notch 8 (Fig. 2) for accommodating a stop or set screw 9 that is threaded through the adjusting ring 3. This screw 9 is intended to prevent turning of the adjusting ring 3 on the element 1 and at the same time it effects a peripheral safety-lock for the axially movable ring shaped part 6. Between this part 6 and the flange 2 is provided a stationary ring shaped seal member 10, made for instance of an inelastic material having good frictional properties. A pipe 11 is connected to sealing ring 10 and which by means of an aperture 12 in member 10 supplies a liquid- or gaseous pressure medium. A channel 13 in the axially movable part 6 allows this pressure medium to flow into the space 14 between the adjusting ring 3 and the movable part 6. Additionally the flange 2 is provided with a bore 15 through which the pressure medium can flow for further utilization.

In the embodiment illustrated in Fig. 3 a rotatable machine element or sleeve 16 is provided with a lateral flange 17. At the opposite end of this element an axially movable adjusting ring 19 is fastened to element 16 by means of a bolt 18. On one side of ring 19 are two axially extending annular flanges 20 and 21, between which there is mounted an O-ring 22 of elastic material, for instance rubber. This O-ring 22 bears against a flange 23 directed against this ring and extending from a ring shaped part 24 that is mounted to be axially movable on the element 16. This ring shaped part 24 is provided with a peripheral flange 25 directed toward the adjusting ring 19 and in flange 25 is fixed an axially directed pin 26, which is movable in a boring 27 provided in the adjusting ring 19. The pin 26 effects a safety-lock in a peripheral direction for the ring shaped part 24 and at the same time it permits ring 24 to be axially displaced on the element 16. A flexible packing 28 is provided between ring 19 and element 16 for adjusting the position of the adjusting ring 19 in the axial direction. On the inside of the ring shaped part 24 and on the inside of the flange 17 are mounted rings 29 and 30 of inelastic material having good frictional properties. These rings 29, 30 are in sealing contact with opposite faces of a ring shaped stationary part 31. The ring shaped part 31 is provided with a radial bore 32 that communicates with a pipe 33 fed with a liquid- or gaseous pressure medium. The bore 32 can, as shown in Fig. 4, pass right through the ring shaped part 31 or only partly, whereby in the first case the bore 32 is by means of the channels 35 and 37 and in the second case by means of the channels 35 and 36 placed in communication with the respective spaces 39 and 38 provided between the adjusting ring 19 and the movable ring shaped part 24. In these spaces 38 and 39 are provided O-rings 40 and 41 of rubber or the like, which under influence of the pressure medium effect sealing between the movable ring 24 and the adjusting ring 19, while the O-ring 22 presses the movable ring 24 with its ring 29 of inelastic material against one end face of stationary ring 31, which in its turn has its outer face pressed against the inelastic ring 30 on the inside of the flange 17.

Channels 42 and 43 are provided in element 16 to allow the pressure medium to flow out.

Figure 6 illustrates the invention as applied to a rotary ring type debarking machine of the type set forth in Andersson Patent 2,623,558 dated December 30, 1952. In this figure, the rotor of the debarking machine includes a hub portion 45, an end wall 46, a peripheral wall 48 and a cylindrical wall portion 47 defining a cylinder 66 in which is displaceable a piston 67, the rod 68 of which carries a debarking tool 69 for debarking a log 70. A toothed ring 49 is secured to the cylinders and hub and is in mesh with four circumferentially spaced pinions 50, only one of which is shown. The pinions are supported in a housing 51. On the hub 45 is fixed a sleeve or ring shaped member 53, which is part of the sealing arrangement. The lefthand end of this sleeve or ring member 53 is externally threaded, while the righthand end of this ring is provided with a lateral flange portion. An axially movable ring member 54 is mounted on the sleeve 53 and is pressed against a ring 55 of inelastic material that is carried by a stationary ring member 56. The other face of ring member 56 is provided with another ring of inelastic material which bears against the adjacent face of the lateral flange on sleeve 53. A pipe or conduit 58 is in communication with a bore through ring 56, within which is mounted a flanged sleeve element 57 that supports the inelastic rings 55. Gaseous medium under pressure such as compressed air is fed to pipe 58 for the dual purpose of flowing through bores 57, 64 and 65 to the cylinder of the rotor and also for the purpose of applying increased sealing pressure between the righthand end face of axially movable ring 54 and the adjacent contacting surface of the ring 55 of inelastic material. As in the form of invention shown in Figure 1, this arrangement includes an internally threaded ring 59 that bears against an O-ring 60 of rubber or synthetic rubber for initially applying pressure against axially movable member 54 to seal the same against the inelastic ring 55. The ring 54 is provided with channels such as 63 through which the compressed air flows into the space between the inner end of threaded ring 59 and the lefthand face of the internal flange on ring 54, so that the pressure acting on this latter ring in the direction against ring 55 is increased.

It is clear, therefore, that in all forms of this invention there is provided a sealing arrangement for sealing any gap between cooperating machine elements that are mounted for relative rotation. The element includes a first ring member that is stationary as regards turning movement that is arranged between two ring shaped or annular rotatable members. The opposite axially spaced surfaces of the stationary ring and the facing surfaces of the respective rotary ring shaped members are separated from one another by rings of inelastic material having good frictional properties. These inelastic rings can be carried by either the opposite faces of the stationary ring shaped member or by the facing surfaces of the two rotatable ring members, or alternatively as in Figure 1, the inelastic ring 12 can be in the form of a sleeve carried by the inner periphery of the stationary ring. In any event, the inelastic rings are in contact with facing metal surfaces of either the stationary ring or the rotatable rings, respectively. One of the rotatable ring members is mounted for axial movement relative to the stationary ring and the other rotatable ring, and an axially movable adjusting member applies pressure against an elastic O-ring that is disposed between such adjusting member and the face of the axially movable ring that is remote from the stationary ring. When this axially adjustable member is moved to apply initial pressure against the axially movable ring, the latter bears against the adjacent inelastic ring so as to in turn apply axially directed pressure on the stationary ring to provide a firm sealing contact between the flange or other rotatable ring and its contacting inelastic ring. In addition, conduits are provided in the stationary ring and axially movable ring to receive pressure mediums such as compressed air to flow into the space between the axially movable adjusting member and the axially movable ring to provide a sealing pressure in excess of that obtained by the initial adjustment.

By means of the above described sealing arrangement there is attained on the one hand an adjustable initial sealing pressure between the cooperating facing surfaces of the stationary and the rotatable part, and on the other hand, and in addition to this initial adjustable pressure, a more or less increased sealing pressure depending on the pressure of the liquid- or gaseous pressure medium.

Among the advantages which may be attained by using the sealing arrangement according to this invention are the following:

(1) Low friction and small leakage.

(2) The sealing arrangement will easily adapt itself to possible unevennesses in the sealing surfaces.

(3) The structure is easy to erect and to dismount.

(4) It will adapt itself automatically for varying liquid- or gaseous pressures.

As branches of use for this sealing device may be mentioned shaft packings for pumps and for transfer of gases from a stationary to a rotatable machine element.

The invention is, of course, not limited to the afore described embodiments, but can be varied in a number of different manners within the scope of the claims. Thus instead of placing the axially movable ring shaped part on the rotatable machine element, this part can be mounted on the stationary ring shaped member and receive an initial axially directed adjusting pressure so as to be forced against the facing side surface of one of the rotatable members.

What I claim is:

1. In a sealing arrangement for providing a seal between relatively rotatable components, a rotatable machine element, a pair of ring members, one of said ring members being fixed with respect to said machine element, the other ring member being spaced from the first ring member and mounted for axial movement along and rotation with said rotatable machine element, an additional ring means disposed between said ring members and supported against turning movement so as to be stationary with respect to said ring members, said additional ring means having axially spaced surfaces and the respective ring members having surfaces facing such axially spaced surfaces, at least two of said surfaces at opposite sides of said additional ring means being constituted by ring means of inelastic material having good frictional property, at least one elastic O-ring mounted on the side of said axially movable ring member remote from said additional ring means for contact therewith, a mechanically, axially adjustable means carried by said machine element for applying axial pressure against said O-ring to thereby apply an adjustable initial sealing pressure against said axially movable ring member to move the same toward said one ring member to initially seal the axially spaced surfaces of the additional ring means against the facing surfaces of the respective ring members and means for applying a gaseous pressure medium against the face of said axially movable ring member that is remote from said additional ring means so as to increase the sealing pressure exerted by said axially movable ring member on said additional ring means.

2. A sealing arrangement as claimed in claim 1 and a conduit for gaseous medium under pressure connected to said additional ring means, said additional ring means also having port means therein, said axially movable ring member having at least one port therethrough in communication with said port means, whereby gaseous medium under pressure can flow into the space between said axially movable ring member and said mechanically, axially adjustable means.

3. A sealing arrangement as claimed in claim 1 and further including means for locking the mechanically axially adjustable means to said axially movable ring member to prevent turning of the latter relative to the former and means for locking the mechanically axially adjustable means on said rotatable machine element.

4. Sealing means as claimed in claim 1 and at least one of the rotatable ring members having at least one outlet in communication with the port means in said additional ring means whereby the gaseous medium under pressure can pass through said outlet for further utilization.

5. In a sealing arrangement between relatively rotatable components, a rotary machine element means having a laterally extending flange thereon, a ring member mounted on said machine element means for axial movement with respect thereto, another ring member interposed between said flange and said axially movable ring member, and supported against turning movement so as to be stationary with respect thereto, an additional ring member connected to said machine element means for axial movement toward said axially movable ring member, at least one elastic O-ring interposed between said additional ring member and said axially movable ring member for engagement therewith and compression therebetween, said axially movable ring member having at least one axial bore therethrough communicating with the space between said additional ring member and said axially movable ring member, annular means of inelastic material constituting at least one of the mutually contacting surfaces between the opposite axially spaced sides of said another ring member, said flange and said axially movable ring member respectively, and conduit means in said another ring member for leading gaseous medium under pressure to said axial bore, whereby said axially movable ring member can be initially adjusted in response to axial movement of said additional ring member to axially compress said O-ring and thus apply sealing pressure via said O-ring on said axially movable ring member and thereafter gaseous medium under pressure can be introduced into the space between the axially movable ring member and said additional ring member to increase the sealing pressure.

6. In a sealing arrangement between relatively rotatable components, a rotary machine element means having a laterally extending flange thereon, a ring member mounted on said machine element means for axial movement with respect thereto, said ring member being spaced from said flange, another ring member interposed between said flange and said axially movable ring member, and supported against turning movement so as to be stationary with respect thereto, an additional ring member connected to said machine element means for axial movement toward said axially movable ring member, elastic O-ring means interposed between said additional ring member and said axially movable ring member for engagement therewith and compression therebetween, said axially movable ring member having at least one axial bore therethrough communicating with the space between said additional ring member and said axially movable ring member, annular means of inelastic material constituting at least one of the mutually contacting surfaces between the opposite axially spaced sides of said another ring member, said flange, and said axially movable ring member respectively, a flange on said first ring member extending axially away from said another ring member and disposed in laterally spaced relation with respect to said machine element means, said machine element means having external threads thereon in the portion lying within said axially extending flange, said additional ring member being disposed between said axially extending flange and said machine element means and having internal threads in engagement with the threads on said machine element means, and conduit means in said another ring member for leading gaseous medium under pressure to said axial bore in said axially movable ring member, whereby said axially movable ring member can be initially adjusted in response to axial movement of said additional ring member to axially compress said O-ring means and thus apply sealing pressure via said O-ring means on said axially movable ring member and thereafter gaseous medium under pressure can be introduced into the space between the axially movable ring member and said additional ring member to increase the sealing pressure.

7. A sealing arrangement as claimed in claim 6 and said axially extending flange having a notch therein, said additional ring member having a radially extending internally threaded bore therethrough, and an externally threaded set screw in threaded engagement with the threads in said bore and having an exposed end portion disposed in said notch so as to lock said additional ring member to said machine element means and to secure said first ring member against turning relative to said machine element means.

References Cited in the file of this patent

UNITED STATES PATENTS

| | | |
|---|---|---|
| 2,455,700 | Porges | Dec. 7, 1948 |
| 2,672,357 | Voytech | Mar. 16, 1954 |
| 2,818,285 | Greiner | Dec. 31, 1957 |

FOREIGN PATENTS

| | | |
|---|---|---|
| 7,369 | Great Britain | Mar. 24, 1910 |
| 649,298 | Germany | Aug. 20, 1937 |
| 1,141,567 | France | Mar. 18, 1957 |